United States Patent [19]

Gray

[11] 4,213,657

[45] Jul. 22, 1980

[54] COMPLIANT HYDRODYNAMIC BEARING WITH TUBULAR SUPPORT ELEMENT

[75] Inventor: Stanley Gray, Skaneateles, N.Y.

[73] Assignee: Mechanical Technology Incorporated, Latham, N.Y.

[21] Appl. No.: 974,257

[22] Filed: Dec. 29, 1978

[51] Int. Cl.³ .................. F16C 32/06; F16C 39/04
[52] U.S. Cl. .................... 308/9; 308/160; 308/DIG. 1
[58] Field of Search ............. 308/9, 26, 36.3, 73, 308/121, 160, 168, DIG. 1

[56] References Cited

U.S. PATENT DOCUMENTS

| 3,382,014 | 5/1968 | Marley | 308/9 |
| 3,809,443 | 5/1974 | Cherubin | 308/9 |
| 4,082,375 | 4/1978 | Fortmann | 308/160 |
| 4,133,585 | 1/1977 | Licht | 308/160 |

Primary Examiner—Richard R. Stearns
Attorney, Agent, or Firm—Joseph V. Claeys; John M. Neary

[57] ABSTRACT

A compliant hydrodynamic fluid film bearing for supporting a rotating motor on a stationary mount, includes a bearing sheet supported by a resilient, compliant support element formed of a series of resilient metal tubular members held in parallel spaced array by a cage. The degree of damping can be selected by filling some or all of the tubes with damping material. The tubular support elements are very strong for their size and weight, and yet produce a support element of only moderate and predictable stiffness.

11 Claims, 6 Drawing Figures

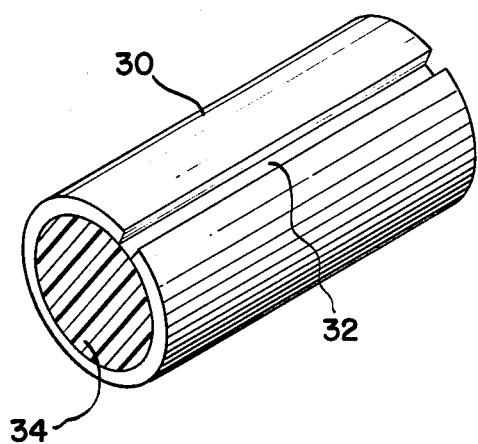
Fig. 3
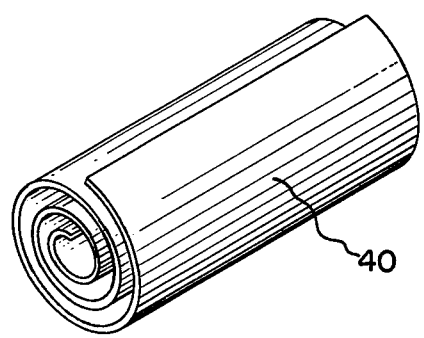
Fig. 4
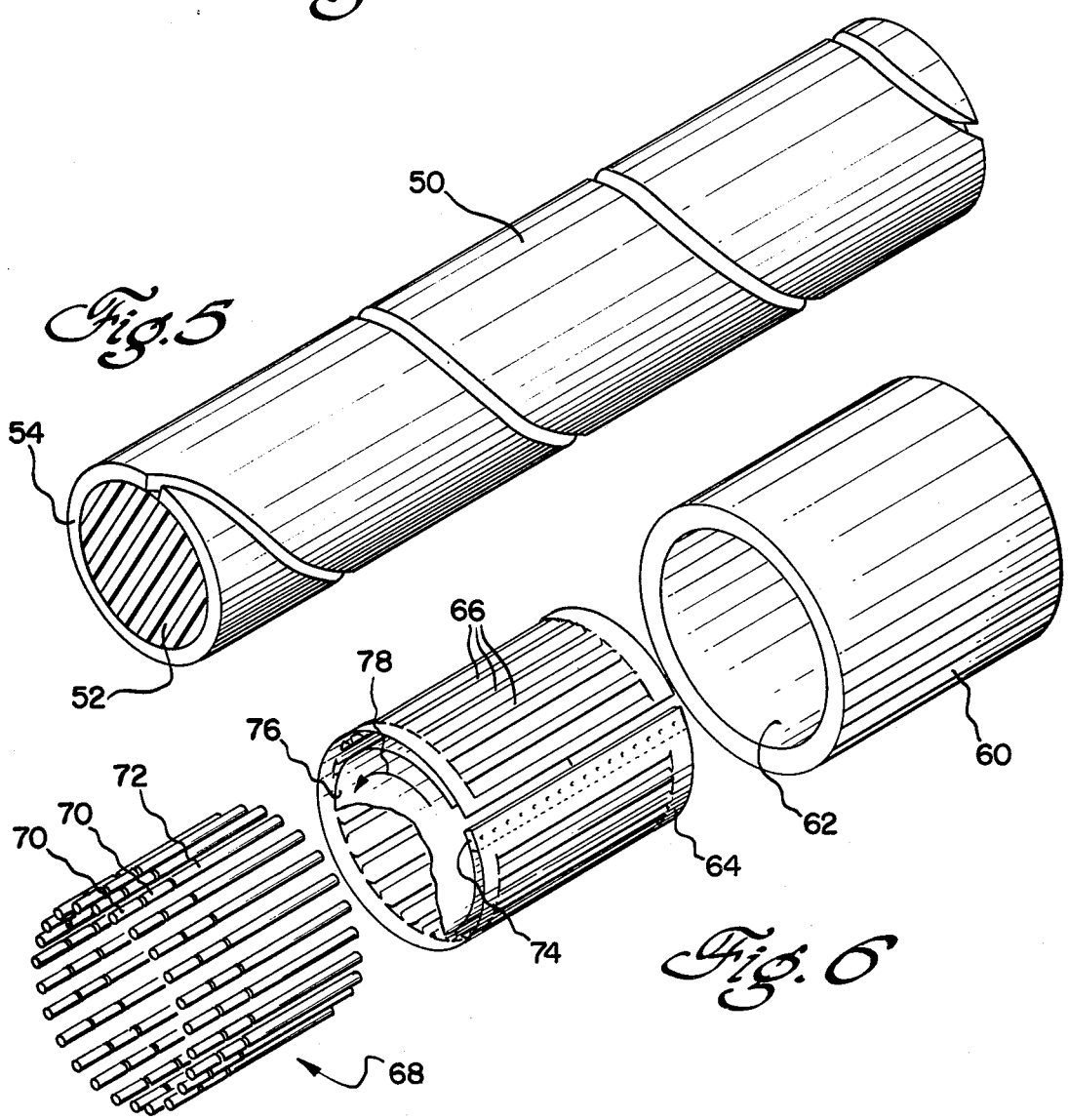
Fig. 5
Fig. 6

COMPLIANT HYDRODYNAMIC BEARING WITH TUBULAR SUPPORT ELEMENT

BACKGROUND OF THE INVENTION

This invention relates to compliant hydrodynamic fluid film bearings, and more particularly to high load capacity bearings which can be manufactured in high volume with extreme precision.

The ultra-high speed capability of the compliant hydrodynamic fluid bearing has increasingly attracted the attention of the bearing experts, not only in fields for which the bearing was originally designed, but also other high-speed applications for which these bearings have potential. In particular, certain high-speed and/or high-temperature applications involving heavy loads present extremely difficult bearing problems which could be ideally solved by a compliant hydrodynamic bearing having greatly increased load bearing capacity.

Compliant hydrodynamic fluid film bearings employ a thin flexible bearing sheet supported on a compliant support element, itself supported on a stationary mounting member of the bearing. The thin flexible bearing sheet and the compliant support element conform to the slope of the bearing surface and the rotating rotor so that the optimum shape and space of the gap between the bearing sheet and the bearing surface of the rotor is close to ideal, despite transient excursions of the rotor bearing surface from its intended plane of operation under the influence of rotor unbalance, externally applied and gyroscopic skew loads, and bearing or rotor misalignment.

The self pressurizing nature of the hydrodynamic bearing is caused by the relative movement of the rotating shaft or rotor which draws a lubricating fluid such as gas or liquid by viscous shear into the bearing surfaces to provide a pressurized fluid cushion for separating and supporting the rotor on the bearing surface. The primary advantage of this form of bearing is that it does not employ rolling bearing elements and therefore is free of their limitations. The theoretical speed limit of hydrodynamic bearings is many times the speed limit of bearings having rolling bearing elements.

The desired compliance contributes significantly to the generation and maintenance of the pressurized hydrodynamic supporting fluid film in the presence of rotor run-out and distortion due to thermal and centrifugal effects. However, the compliance also imposes a certain limitation on the uses to which this bearing can be applied. The stiffness of the supporting element should be less than the stiffness of the fluid film so that the supporting element will deflect before the fluid film is breached by a high speed rotating bearing surface.

The limited load capacity, which has in the past foreclosed some of these applications of compliant hydrodynamic bearings, is a consequence of the thin gauged material used in the support element to achieve the desired compliance. A heavy load on the support element produces a stress level which can cause premature failure or deformation beyond the elastic limit of the material. The conventional solution to this problem would be to use a thicker gauge material for the support element to reduce the stress and thereby increase the load capacity. However, I believe that the support element of the conventional design made with material of a gauge thick enough to result in a low stress level at the desired load, would be so stiff that it would cause other problems. For example, it would not conform to the opposing bearing surfaces on the rotating rotor as readily as a more compliant support, and therefore would lose a portion of the hydrodynamic effect in the event of deviations of the rotor bearing surface from its desired plane of operation. Finally, a high stiffness bearing requires much closer tolerances in manufacturing which increases fabrication assembly and inspection time and costs with the previous type construction.

One solution to these problems is disclosed in copending application Ser. No. 974,257, entitled "Improved Foil Bearing Having Increased Mechanical Strength and Controlled Stiffness" utilizing two spring sheet members arranged with resilient elevations aligned and facing in opposite directions. This solution does indeed solve the problems in an entirely satisfactory manner. As an alternative to this solution, however, I have conceived the following high load capacity high precision bearing which can be manufactured inexpensively in mass production quantities.

SUMMARY OF THE INVENTION

Accordingly, it is an object of this invention to provide a compliant hydrodynamic fluid film bearing having a high load capacity with support elements which are of inherently high strength relative to their stiffness and easily controllable. This bearing can be manufactured in mass production quantities with high precision and very low costs.

The bearing includes a bearing sheet supported by an array of tubular members retained in position in a cage arrangement.

DESCRIPTION OF THE DRAWINGS

The invention and its many attending advantages and objects will become better understood by reference to the following specification when read in conjunction with the accompanying drawings wherein:

FIG. 3 is a perspective view of a second embodiment of a tubular element for use in this invention;

FIG. 4 is a perspective view of a third embodiment of a tubular element for use in this invention;

FIG. 5 is a perspective view of a fourth embodiment of a tubular element for use in this invention.

FIG. 6 is a perspective view of a journal bearing made in accordance with this invention.

DESCRIPTION OF THE PREFERRED EMBODIMENT

Figure 1:
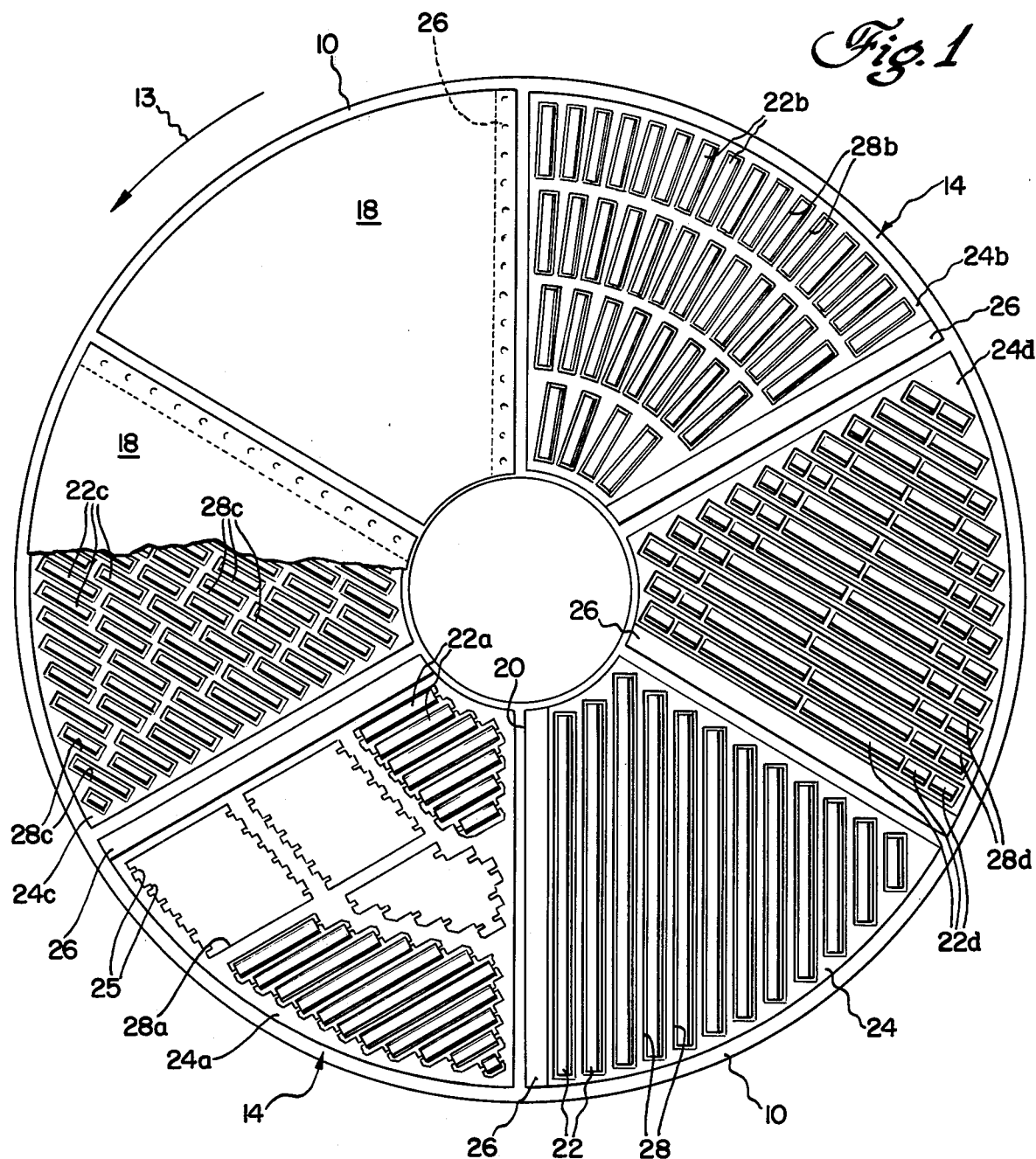
FIG. 1 is a plan view, partially cut away, of a thrust bearing made in accordance with this invention.
Figure 2:
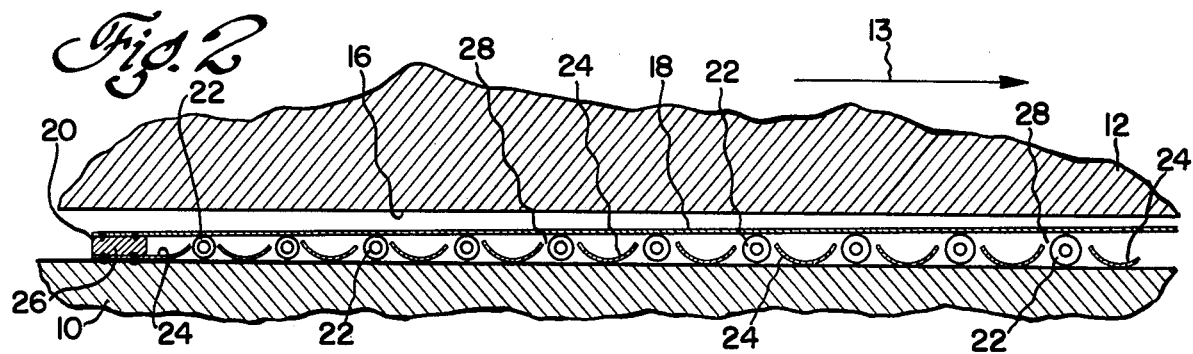
FIG. 2 is a sectional elevation along lines 2—2 in FIG. 1.

Referring now to the drawings wherein like reference characters designate identical or corresponding parts, and more particularly to FIGS. 1 and 2 thereof, the bearing surface of a thrust bearing is shown having a stationary thrust plate 10 mounted parallel to a thrust runner 12 rotating in the direction of arrow 13. A plurality of pads 14 are mounted on the surface of the thrust plate 10 facing a bearing surface 16 of the thrust runner 12.

Each of the pads 14 includes a bearing sheet 18 formed of thin, flexible metal and attached to the plate 10 at one edge 20, which is the leading edge with respect to the direction of rotation of the thrust runner 12. The bearing sheet 18 is supported by an array of tubular elements 22 lying closely together and held in a closely spaced array by a cage member 24.

Referring now to FIG. 2, the fastening of the bearing sheet 18 at its leading edge 20 is to the top of an elongated, radially extending spacer block 26 which is fixed in place on the thrust plate 10. The sheet 18 is itself welded to the top of the spacer block 26 by a plurality of closely spaced spot welds or by resistance seam welding.

The cage member 24 is formed of sheet metal which has been sheared and stamped to provide a plurality of elongated openings 28 dimensioned to receive the tubular elements as shown in FIG. 2. One method of forming the cage member 24 is to shear a series of elongated I-shaped slits in a truncated sector of sheet metal. The sector can be sheared from a sheet of metal in the same operation which shears the slits. The metal on each side of the slit is bent upwardly to produce an opening into which a tubular element 22 is received.

The cage member 24 is fastened at one edge 20 to the spacer block 26. One convenient technique for fastening the elements together is to weld the spacer block 26 between the leading edges 20 of the bearing sheet 18 and the cage member 24. The assembly is then welded to the thrust plate at the leading edge 20.

Other forms of cage member are also possible and some examples are shown in FIG. 1. All of these examples could be used on a single thrust bearing as shown in FIG. 1, or only one or two forms could be used, depending on the requirements. At the 7:00 position, a frame cage 24a is shown with inwardly extending pins or tabs 25 on the circumferential sides of its openings 28a. The tabs 25 can be bent into the bore of the tubular elements 22a to hold them in position. Short radially extending openings are shown in the cage 24b in the 1:00 o'clock sector, and short, staggered openings running parallel to the leading edge 20 are shown in the cage 24c in the 9:00 o'clock sector. Other cage designs can be selected by those skilled in the art, for example, by referring to needle bearing cage technology.

The tubular elements themselves could, for example, be HYPOFLEX seamless needle tubing made by Superior Tubing Company of Norristown, Pa. The tubing can be formed of Inconel Alloy X-750 and manufactured in a wide range of diameters and wall thicknesses to very exact tolerances, in the order of +0.0005 −0.0000. It can be purchased in long lengths which are easily cut to the desired shorter lengths. The cutting can be by an abrasive cut-off wheel and can be done in conjunction with a constricting action that tapers the ends of the tube so that they do not present a sharp edge to the bearing sheet, and to provide improved misalignment tolerance, as set forth in the co-pending application ser. no. 974,263, entitled "Improved Support Element for Compliant Hydrodynamic Journal Bearings" of Gray and Bhushan, the disclosure of which is hereby incorporated by reference.

For the purposes of improved compliance in the direction of elongation of the tubes, the tubes 22e may be cut to shorter lengths than the radius of the pad, as shown in the 3:00 o'clock sector, and the shorter length pieces aligned axially in the openings 28d in the cage member 24d. This arrangement enables the various aligned sections of tubing to flex independently of each other and permits close axial spacing of the tubing pieces 22d.

Another technique to increase damping in this embodiment of the invention is to coat the tubular members 22 and/or the cage member 24 with a friction enhancing coating, such as copper, to increase the coefficient of friction between the tubular members and the cage member. In addition, or alternatively, the cage member and/or the tubular members can be treated with a friction enhancing surface treatment such as electro-etching to further increase the coefficient of friction between the two parts.

Two other forms of tubular member have been devised to increase damping. Both of these embodiments are similar to tubular members which were originally designed as locking pins. The first, shown in FIG. 3, is a split pin 30 having a longitudinal split 32 running its entire length. The pin is filled with a damping material 34 such as an elastomer which produces viscous damping during flexing of the pin in operation. The other tubular member also similar to a locking pin, is a spiral pin shown in FIG. 4. The spiral pin 40 is a wound elongated spiral of sheet metal which, when flexing in operation, scrubs together the adjacent surfaces of adjacent layers to provide coulomb or frictional damping. This form of tubular member may need grinding along the outer edge of the material to ensure exact uniformity of shape.

A fourth embodiment of the tubular member is shown in FIG. 5. This embodiment utilizes a narrow strip 50 of sheet metal wound in an axial spiral and filled with damping material 52 such as the elastomer used in the embodiment of FIG. 3. This arrangement provides coulomb damping of the helical edges of the material as they scrub against each other in operation and also provides viscous damping provided by the damping material which fills the center of the axial spiral. It also provides increased flexibility and good control of stiffness. The ends 54 of the tubular member of FIG. 5 will be typically ground to the correct length and squareness and the entire tubular member can be ground if the manufacturing techniques do not produce the degree of uniformity desired.

As shown in FIG. 2, the tubular elements can be graduated in size from the tubular element nearest the leading edge 20, gradually increasing in diameter to the tubular element nearest the trailing edge. This arrangement produces a natural wedge-shaped gap between the bearing sheet 18 supported on the tubular elements and the surface 16 of the thrust runner so that the optimum hydrodynamic effect is produced. Typically, the slope of this wedge is approximately 1 mil. or less in height per inch of circumference. This very precise slope is difficult to achieve with other compliant hydrodynamic bearings, but can be achieved in this invention with great precision and reliability by using the tubular elements which are available on the market.

The stiffness and load carrying capacity of the bearing can be easily controlled by selecting the wall thickness and diameter of the tubular elements.

A journal bearing made according to this invention and shown in FIG. 6 includes a journal sleeve 60 having a cylindrical bore 62 which receives a cage element 64 having axially extending openings 66 therein for receiving and holding in parallel spaced array a series of tubular support elements 68. The tubular elements 68 can be cut into several sections as shown in FIG. 6, including two short end sections 70 at one end and a longer end section 72 at the other end to improve misalignment tolerance of the bearing in the manner suggested for the embodiment of FIGS. 1 and 2. Two journal bearings are used to support a shaft and are arranged with the long end sections on the inboard side of the bearing pair, that is, facing the other journal bearing of the pair.

A spacer block is fastened to the inside face of the trailing edge of the cage element 64 and a bearing sheet 76 is fastened to the top of the spacer block 74. The assembly of cage element 64, spacer block 74 and bearing sheet 76 is fastened in the bore 62 of the sleeve 60 and the support elements 68 are located in the openings 66. A shaft (not shown) is supported on the bearing sheet 76 for rotation in the direction of the arrow 78.

Obviously, numerous modifications and variations to the disclosed preferred embodiments are possible while securing the benefits of the invention. It is expressly to be understood, therefore, that these changes may be practiced while remaining within the spirit and scope of the invention, which is defined by the following claims, wherein I claim:

1. A compliant, hydrodynamic, fluid film bearing, comprising:
   a stationary member and a relatively rotating rotor having a bearing surface, said stationary member and said bearing surface defining therebetween a gap for receiving a composite bearing assembly
   a composite bearing assembly received within said gap including a plurality of tubular resilient support elements, a cage member for holding said tubular elements in position, and a bearing sheet overlying and resiliently supported by said tubular support elements.

2. The bearing defined in claim 1, wherein said cage member includes a sheet metal member having openings for receiving and holding said tubular elements.

3. The bearing defined in claim 2, wherein said openings are defined by the edges of a plurality of elongated slits, said edges being bent upwardly out of the plane of said sheet metal.

4. The bearing defined in claim 2 wherein said openings are elongated, and said tubular elements in at least some of said openings are divided into a plurality of sections lying along the axis of the opening.

5. The bearing defined in claim 1, wherein said tubular elements include fine needle tubing.

6. The bearing defined in claim 1, wherein said tubular elements include a longitudinally split tubular pin filled with damping material.

7. The bearing defined in claim 1, wherein said tubular elements include a spiral wrapped sheet metal pin.

8. The bearing defined in claim 1, wherein said tubular elements include a helically wrapped ribbon of sheet metal with a core of damping material.

9. The bearing defined in claim 1, wherein said tubular elements lie parallel to each other and parallel to the leading edge of said bearing sheet in the sense of the rotation direction of said rotor.

10. The bearing defined in claim 9, wherein said cage member includes a plurality of elongated openings all lying parallel to said leading edge, said openings being arranged in rows extending parallel to said leading edge and staggered in adjacent rows.

11. The bearing defined in claim 9, wherein said cage member includes openings having pins extending inwardly from the peripheral edges of said openings, said tubular elements being mounted on said pins in a closely spaced array.

* * * * *